United States Patent
Antony

(10) Patent No.: US 10,218,622 B2
(45) Date of Patent: Feb. 26, 2019

(54) PLACING A NETWORK DEVICE INTO A MAINTENANCE MODE IN A VIRTUALIZED COMPUTING ENVIRONMENT

(71) Applicant: VMWARE, INC., Palo Alto, CA (US)

(72) Inventor: Jinto Antony, Bangalore (IN)

(73) Assignee: VMWARE, INC., Palo Alto, CA (US)

(*) Notice: Subject to any disclaimer, the term of this patent is extended or adjusted under 35 U.S.C. 154(b) by 1131 days.

(21) Appl. No.: 13/892,332

(22) Filed: May 13, 2013

(65) Prior Publication Data
US 2014/0337529 A1   Nov. 13, 2014

(51) Int. Cl.
| | |
|---|---|
| *G06F 15/173* | (2006.01) |
| *H04L 12/803* | (2013.01) |
| *H04L 12/707* | (2013.01) |
| *H04L 12/775* | (2013.01) |
| *H04L 12/24* | (2006.01) |
| *H04L 12/931* | (2013.01) |

(52) U.S. Cl.
CPC ........ *H04L 47/125* (2013.01); *H04L 41/0816* (2013.01); *H04L 45/22* (2013.01); *H04L 45/58* (2013.01); *H04L 49/70* (2013.01)

(58) Field of Classification Search
CPC ..... H04L 41/0816; H04L 45/22; H04L 45/58; H04L 47/125; H04L 49/70; G06F 9/5088
USPC .......... 709/220, 223, 208, 227, 230
See application file for complete search history.

(56) References Cited

U.S. PATENT DOCUMENTS

| | | | | |
|---|---|---|---|---|
| 5,291,544 A * | 3/1994 | Hecker | ................ | H04W 36/12 455/436 |
| 6,173,411 B1 * | 1/2001 | Hirst | ................... | H04L 12/2697 709/223 |
| 6,735,176 B1 * | 5/2004 | So | ...................... | H04Q 11/0062 370/231 |
| 7,797,426 B1 * | 9/2010 | Lyon | ................... | H04L 67/1008 709/219 |
| 8,131,836 B2 * | 3/2012 | Lyon | ................... | H04L 67/1008 709/217 |
| 8,331,362 B2 * | 12/2012 | Shukla | ................ | H04L 41/0843 370/389 |
| 8,429,647 B2 * | 4/2013 | Zhou | ..................... | G06F 9/4856 718/1 |
| 8,578,076 B2 * | 11/2013 | van der Linden | .... | G06F 9/5077 709/227 |
| 8,874,749 B1 * | 10/2014 | Vittal | ............................ | 709/226 |

(Continued)

*Primary Examiner* — Michael Won

(57) ABSTRACT

Techniques for placing a first network device into maintenance mode are described. In one embodiment, a first host computing system coupled to the first network device is identified. The first host computing system executes a workload that transmits and receives network traffic via the first network device. If the first host computing system is not coupled to any other network device, the network traffic to the first network device is quiesced by initiating migration of the workload to a second host computing system coupled to any other network device. If the first host computing system is coupled to a second network device, the network traffic to the first network device is quiesced by instructing a virtual switch of the first host computing system to route the network traffic between the workload and the second network device, and cease routing the network traffic between the workload and the first network device.

25 Claims, 6 Drawing Sheets

(56) References Cited

U.S. PATENT DOCUMENTS

| | | | | |
|---|---|---|---|---|
| 2002/0138629 A1* | 9/2002 | Schmidt | G06F 9/4862 | 709/228 |
| 2007/0067435 A1* | 3/2007 | Landis | G06F 9/5016 | 709/224 |
| 2007/0083662 A1* | 4/2007 | Adams | H04L 5/0053 | 709/229 |
| 2007/0280223 A1* | 12/2007 | Pan | H04L 12/6418 | 370/360 |
| 2008/0219268 A1* | 9/2008 | Dennison | H04L 12/4625 | 370/395.2 |
| 2009/0327392 A1* | 12/2009 | Tripathi | G06F 15/16 | 709/201 |
| 2010/0125903 A1* | 5/2010 | Devarajan | G06F 21/577 | 726/15 |
| 2010/0169497 A1* | 7/2010 | Klimentiev | G06F 9/546 | 709/228 |
| 2010/0287548 A1* | 11/2010 | Zhou | G06F 9/4856 | 718/1 |
| 2011/0029973 A1* | 2/2011 | Hara | G06F 3/0607 | 718/1 |
| 2011/0161957 A1* | 6/2011 | Bernardi | G06F 9/4445 | 718/1 |
| 2012/0044804 A1* | 2/2012 | Rahman | H04L 45/22 | 370/225 |
| 2012/0066519 A1* | 3/2012 | El-Essawy | H05K 7/1492 | 713/300 |
| 2012/0195187 A1* | 8/2012 | Ashihara | G06F 9/46 | 370/220 |
| 2012/0209989 A1* | 8/2012 | Stewart | G06F 9/5061 | 709/224 |
| 2012/0324259 A1* | 12/2012 | Aasheim | G06F 1/3206 | 713/320 |
| 2013/0086272 A1* | 4/2013 | Chen | G06F 9/4856 | 709/226 |
| 2013/0125230 A1* | 5/2013 | Koponen | H04L 41/0823 | 726/13 |
| 2013/0219384 A1* | 8/2013 | Srinivasan | G06F 9/45558 | 718/1 |
| 2013/0275567 A1* | 10/2013 | Karthikeyan | H04L 41/0816 | 709/221 |
| 2014/0013324 A1* | 1/2014 | Zhang | H04L 49/70 | 718/1 |
| 2014/0269254 A1* | 9/2014 | Choorakkot Edakkunni | H04L 41/082 | 370/218 |
| 2016/0070617 A1* | 3/2016 | Algie | G06F 11/1076 | 714/766 |

* cited by examiner

PLACING A NETWORK DEVICE INTO A MAINTENANCE MODE IN A VIRTUALIZED COMPUTING ENVIRONMENT

TECHNICAL FIELD

The present disclosure relates to methods, techniques, and systems for network resource management in a virtualized computing environment and, more particularly, to methods, techniques, and systems for placing a network device into a maintenance mode for service/repair, replacement, hardware upgrade and/or software upgrade.

BACKGROUND

Computer virtualization is a technique that involves encapsulating a representation of a physical computing machine platform into a virtual machine (VM) that is executed under the control of virtualization software running on hardware computing platforms (also referred to herein as "hosts" or "host computing systems"). A group of hardware computing platforms may be organized as a cluster to provide hardware resources for VMs. In a data center, it is common to see multiple network switches and multiple VMs running on multiple clusters of hosts with each host connected to at least one of the multiple network switches.

DETAILED DESCRIPTION

Figure 1:
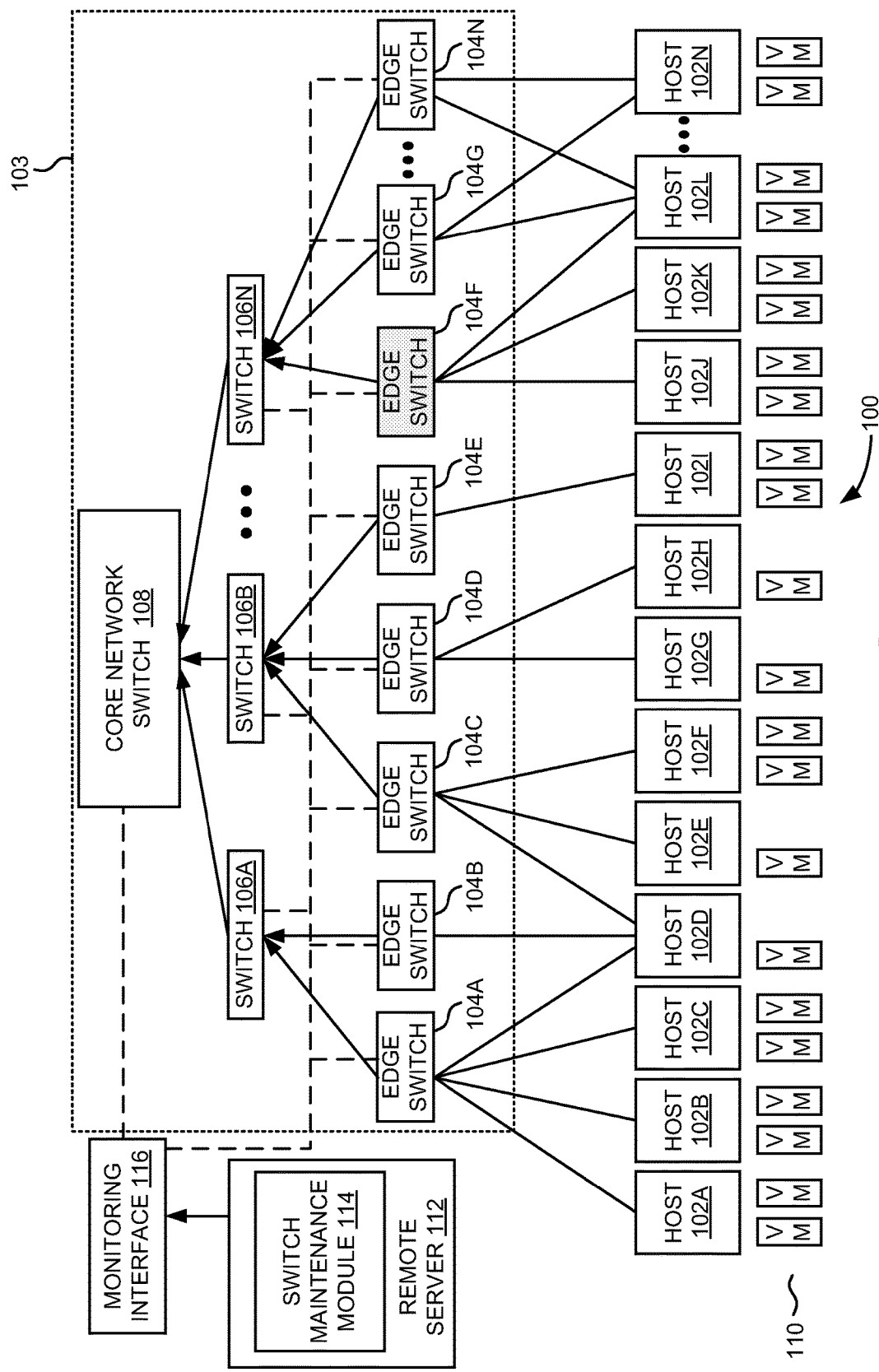
FIG. 1 depicts quiescing network traffic to a network switch from a host computing system having connections to other network switches by instructing virtual switches to route the network traffic through the other network switches.

Embodiments described herein provide enhanced computer and network based methods, techniques, and systems for placing a network device (e.g., a network switch) into a maintenance mode in a virtualized computing environment. The term "virtualized computing environment" is used herein to refer to a physical infrastructure that hosts a virtual infrastructure comprising virtual objects such as virtual machines (VMs), virtual data centers (VDCs), and virtual appliances (vApps). The term "network switch" is used in the following description, however, in the present invention it is used broadly to refer to any network device capable of routing/carrying the network traffic such as routers, switches, multi-function devices having a routing function, edge gateways, and so on. Further, the term "maintenance mode" refers to quiescing network traffic to a network switch that needs to be taken out of service. For example, a network switch needs to be placed into a maintenance mode either for replacement, service/repair, hardware upgrade and/or software upgrade. Furthermore, the term "exiting maintenance mode" refers to resumption of normal network traffic through a network switch.

Today, a system administrator needs to ensure that a network switch is not carrying any critical network traffic either to service or replace the network switch. To service or replace the network switch, the system administrator may need to shutdown workload (e.g., virtual machines), shutdown host computing systems or manually move around the network connections associated with the network switch.

The present technique provides a switch maintenance module 114 that identifies host computing systems executing workloads that transmit and receive network traffic via the network switch and quiesces (i.e., temporarily inactivates or disables) the network traffic to the network switch by dynamically routing the network traffic passing through the network switch between the workloads and other network switches. This can be achieved by dynamically instructing virtual switches associated with the identified host computing systems to route the network traffic between the workloads and the other network switches and/or dynamically initiating migration (e.g., live migration) of the workloads to other host computing systems coupled to the other network switches based on a network topology map and network traffic at the other network switches. The term "network topology map" refers to a map showing the relationships/connections between the network switches, host computing systems and workloads in the virtualized computing environment. For example, the network topology map is used to determine the interconnections between the network switches and the host computing systems.

In one example embodiment, if an identified host computing system is coupled to the other network switch, the virtual switch is instructed to route the network traffic between the workload and the other network switch. In this case, the workload of the identified host computing system is connected to a different physical network interface card (NIC) device which is connected to the other network switch. If the identified host computing system is not coupled to any other network switch, the workload is migrated to other host computing system coupled to any other network switch. This process is repeated for all the identified host computing systems coupled to the network switch. In one example embodiment, a distributed resource scheduling framework can manage selection of network switches to route the network traffic and selection of host computing systems to migrate the workloads.

FIG. 1 depicts quiescing network traffic to network switch 104F from host computing system 102L having connections to other network switches 104G and 104N by instructing a virtual switch of host computing system 102L to route the network traffic through other network switch 104G or 104N. In the example shown in FIG. 1, virtualized computing environment 100 includes network fabric 103 showing various network switches that are configured in a hierarchical model (i.e., edge switches 104A-N in a first level, switches 106A-N in a second level, and core network switch 108 in a third level) and their connections. Further, virtualized computing environment 100 includes host computing systems 102A-N, monitoring interface 116, and remote server 112. Each host computing system 102A-N has one or more virtual machines (VMs) 110 running therein. Furthermore, host computing systems 102A-N are connected to associated network switches 104A-N at the first level, which in turn connected to associated network switches 106A-N at the second level.

Monitoring interface 116 represents all interfaces, protocols, and other mechanisms for discovering network topology maps and monitoring network statistics, including traffic at each port of a network switch. For example, the link layer discovery protocol (LLDP) is a protocol used by network switches to advertise their identity, capabilities, and neighbors on an Ethernet local area network (LAN). LLDP can be used to assemble a network topology map. The simple network management protocol (SNMP) and remote network monitoring (RMON) both allow collection of network traffic statistics including the traffic at each port of a network switch. Other proprietary and non-proprietary techniques exist for monitoring networks, and it is intended that monitoring interface 116 serve as a generic representation of these techniques.

Remote server 112 includes switch maintenance module 114. One skilled in the art can appreciate that switch management module 114 can also be provided in a VM or virtual application that can run on any host computing system and can be provided to a user through a graphical user interface as a part of management software. In operation, switch maintenance module 114 obtains network traffic and a network topology map associated with the network switches using monitoring interface 116. The network topology map here refers to a map showing the relationships between the network switches, host computing systems 102A-N and VMs in virtualized computing environment 100.

In the example shown in FIG. 1, switch maintenance module 114 initiates a maintenance mode operation of network switch 104F. For example, network switch 104F needs to be placed into the maintenance mode for replacement, hardware upgrade, service/repair and/or software upgrade. Further, switch maintenance module 114 identifies host computing systems 102J, 102K and 102L that are coupled to network switch 104F using the network topology map. In this case, host computing systems 102J, 102K and 102L execute workloads (e.g., VMs 110) that transmit and receive network traffic via network switch 104F. Furthermore, switch maintenance module 114 determines whether host computing systems 102J, 102K and 102L are coupled to any other network switch using the network topology map.

In the example illustrated in FIG. 1, host computing systems 102J and 102K are not coupled to any other network switch and host computing system 102L is also coupled to network switches 104G and 104N. Therefore, switch maintenance module 114 instructs a virtual switch of host computing system 102L to route the network traffic between the VM and network switch 104G or 104N and to cease routing the network traffic between the VM and network switch 104F. Thus the network traffic between host computing system 102L and network switch 104F is quiesced. For example, upon instructing the virtual switch associated with host computing system 102L, the virtual switch associated with host computing system 102L is connected to one of physical NIC devices which are connected to network switches 104G and 104N.

Further, one of network switches 104G and 104N is selected to route the network traffic associated with host computing system 102L based on the network traffic at network switches 104G and 104N. In this case, switch maintenance module 114 determines the network traffic at network switches 104G and 104N and then selects the underutilized network switch (i.e., the network switch having minimum network traffic) to route the network traffic associated with host computing system 102L.

Figure 2:
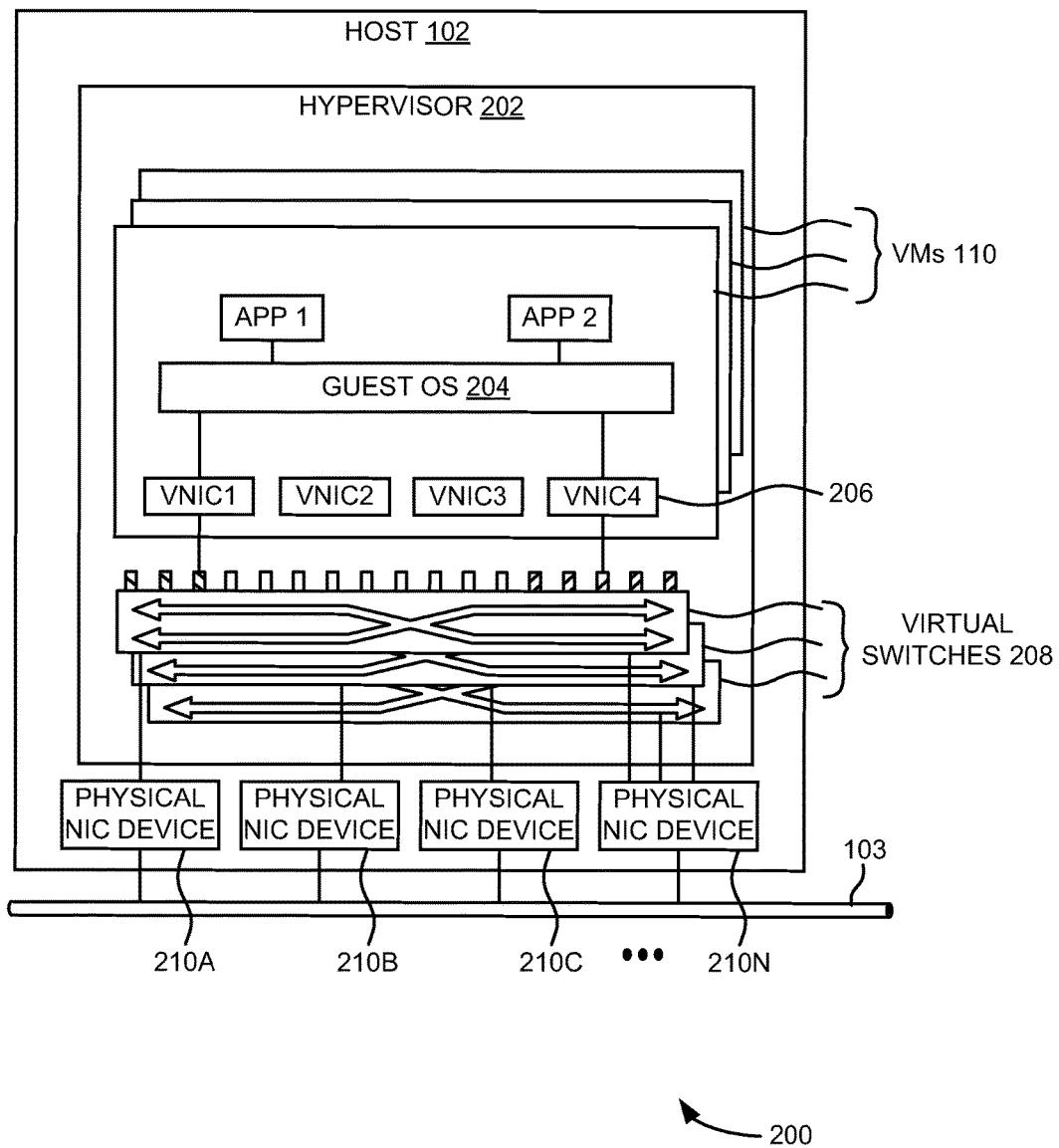
FIG. 2 depicts an example host computing system architecture in which embodiments herein may be practiced.

Referring to FIG. 2, which is architecture 200 of host computing system 102, such as host computing systems 102A-N shown in FIG. 1, including virtual switches 208 for connecting VMs 110 to network switches 104A-N in the context of the present invention. Host computing system 102 includes hypervisor 202 (i.e., a virtualization layer) that manages assignment of physical host computing system resources to guest operating systems (GOSs) 204. VMs 110 include GOSs 204 executing applications (e.g., APP 1 and APP 2) and multiple virtual network interface cards (VNICs) 206. VNICs 206 are connected to associated virtual switches 208 that provide network switch functionality for the network interfaces. Virtual switches 208 are connected to physical NIC devices 210A-N in host computing system 102 to connect VMs 110 to network fabric 103. In the example shown in FIG. 1, network fabric 103 includes various network switches (e.g., 104A-N and 106A-N) and their connections. Each of physical NIC devices 210A-N is connected to a different network switch (e.g., network switches 104A-N of FIG. 1). In other words, if host computing system 102 includes two or more physical NIC devices, then host computing system 102 can connect to two or more network switches and if host computing system 102 includes one physical NIC device, then host computing system 102 can only connect to one network switch.

Referring back to FIG. 1, switch maintenance module 114 instructs virtual switch 208 of host computing system 102L to route the network traffic between the VM and network switch 104G or 104N and to cease routing the network traffic between the VM and network switch 104F. However, host computing systems 102J and 102K are not coupled to any other network switch. In this case, the network traffic to network switch 104F is quiesced by initiating migration of the VMs running on host computing systems 102J and 102K to host computing systems coupled to any other network switch in virtualized computing environment 300 as described in more detail with reference to FIG. 3.

Figure 3:
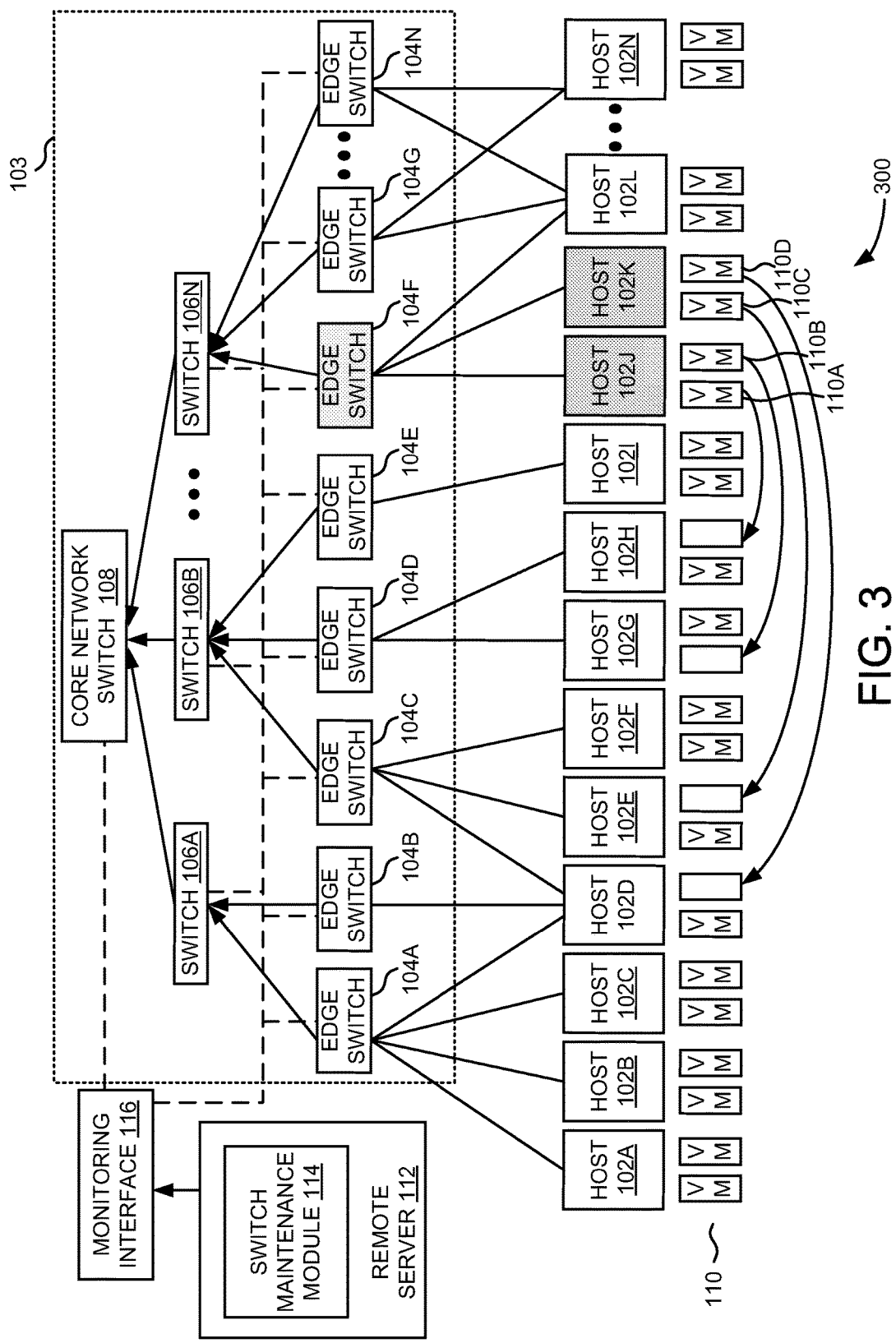
FIG. 3 depicts quiescing network traffic to the network switch from host computing systems that are not coupled to any other network switch by initiating migration of virtual machines (VMs) to other host computing systems coupled to other network switches.

FIG. 3 depicts quiescing network traffic to network switch 104F from host computing systems 102J and 102K that are not coupled to any other network switch by initiating migration of VMs 110A-D running on host computing systems 102J and 102K to other host computing systems coupled to other network switches. In the example shown in FIG. 3, switch maintenance module 114 initiates migration of VMs 110A-D to host computing systems 102H, 102G, 102E, and 102D, respectively. Further, host computing systems 102H, 102G, 102E, and 102D are selected to migrate VMs 110A-D based on the network traffic at network switches 102A-E and 102G-N. In this case, switch maintenance module 114 determines the network traffic at network switches 102A-E and 102G-N and then selects underutilized network switches (i.e., the network switches having minimum network traffic) to initiate migration of VMs 110A-D to host computing systems 102H, 102G, 102E, and 102D that are coupled to the underutilized network switches.

Further, a resource scheduling framework migrates VMs 110A-D running on host computing systems 102J and 102K based on availability of computing resources (e.g., central processing unit (CPU) and memory) at destination host computing systems 102H, 102G, 102E, and 102D. For example, the resource scheduling framework manages allocation and de-allocation of computing resources to the VMs.

As another example, when network switch 104B needs to be placed into maintenance mode, switch maintenance module 114 identifies host computing system 102D that is coupled to network switch 104B. In the example shown in FIG. 1 and FIG. 3, host computing system 102D is also connected to network switches 104A and 104C. In this case, instructing a virtual switch of host computing system 102D to route network traffic between the VMs and network switch 104A or 104C quiesces all the network traffic to network switch 104B. Therefore, switch maintenance module 114 instructs the virtual switch of host computing system 102D to route network traffic between the VMs and network switch 104A or 104C. Upon quiescing the network traffic to network switch 104B, network switch 104B can be placed into the maintenance mode.

As yet another example, when network switch 104E needs to be placed into the maintenance mode, switch maintenance module 114 identifies host computing system 102I that is coupled to network switch 104E. In the example shown in FIG. 1 and FIG. 3, host computing system 102I is not coupled to any other network switch. In this case, switch maintenance module 114 initiates migration of VMs 110 running on host computing system 102I to other host computing systems. Upon migrating the VMs to other host computing systems, network switch 104E can be placed into the maintenance mode.

Figure 4:
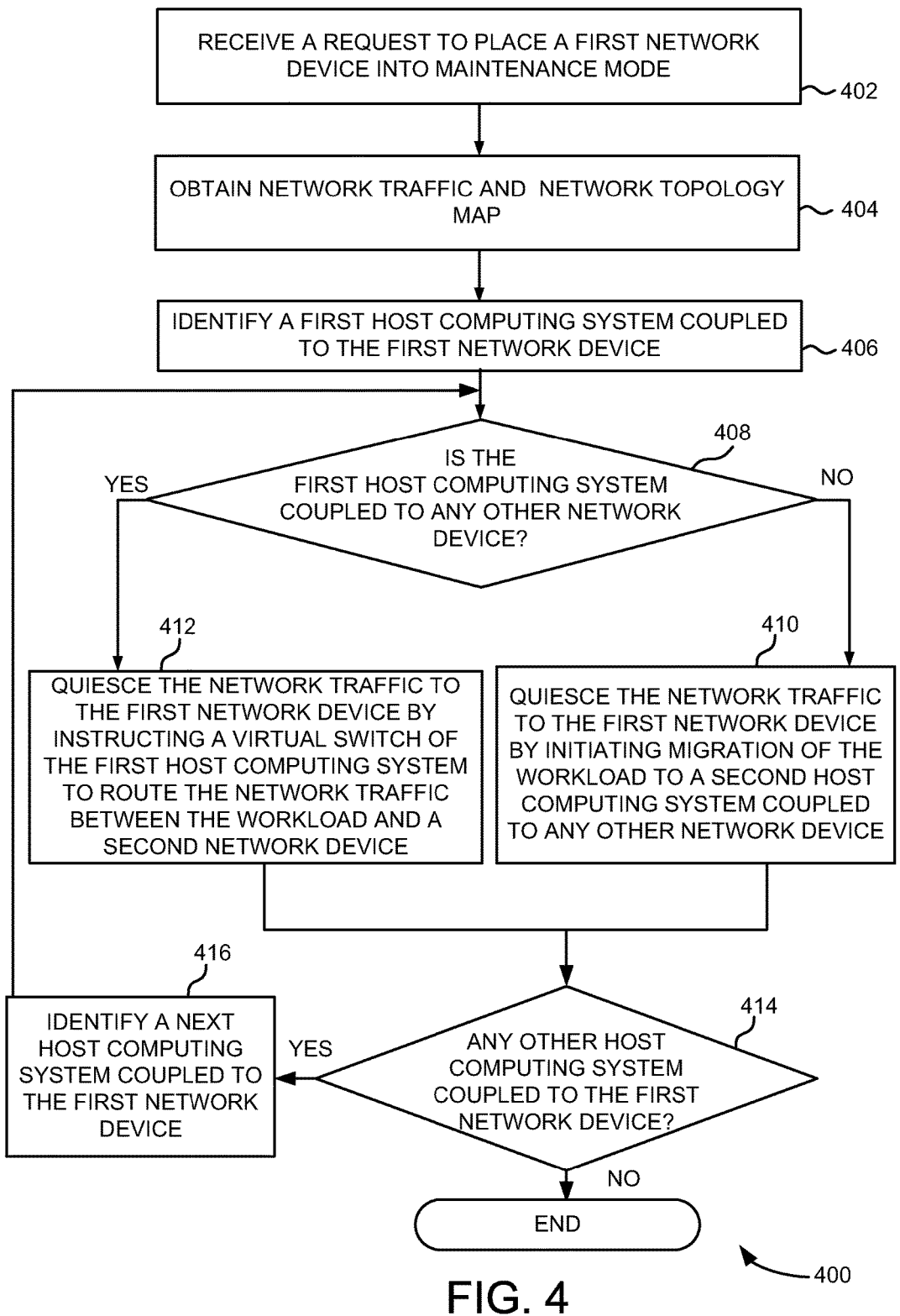
FIG. 4 is a flow chart of an example method for placing a network device into a maintenance mode in a virtualized computing environment.

FIG. 4 is a flow chart 400 of an example method for placing a network device into a maintenance mode in a virtualized computing environment. In one example, the virtualized computing environment includes host computing systems. Further, each host computing system has one or more workloads (e.g., VMs) running therein and each host computing system is coupled to one or more network devices. As discussed above, the term "maintenance mode" refers to quiescing network traffic to the network device that needs to be taken out of service. For example, the network device refers to any device capable of routing/clearing the network traffic such as routers, switches, home gateway router, modem racks and so on.

At step 402, a request to place a first network device into a maintenance mode is received. At step 404, network traffic and a network topology map associated with the network devices are obtained. In an example, the network traffic and the network topology map associated with the network devices are obtained using a monitoring interface (e.g., interfaces, protocols, and other mechanisms for discovering network topology maps and monitoring network statistics) as described above in more detail with reference to FIG. 1. The network topology map refers to a map showing the relationship between the network devices, host computing systems and workloads in the virtualized computing environment. The network traffic is the traffic that is transmitted and received via the network devices.

At step 406, a first host computing system coupled to the first network device is identified (e.g., using the network topology map). In this case, the first host computing system executes a workload that transmits and receives network traffic via the first network device. At step 408, a check is made to determine whether the first host computing system is coupled to any other network device. At step 410, if the first host computing system is not coupled to any other network device, the network traffic to the first network device is quiesced by initiating migration (e.g., live migration) of the workload to a second host computing system that is coupled to any other network device. A resource scheduling framework selects the second host computing system based on availability of computing resources (e.g., CPU and memory) at the second host computing system. Further, network traffic at the network devices coupled to the second host computing system is also considered for initiating migration of the workload.

At step 412, if the first host computing system is coupled to a second network device, the network traffic to the first network device is quiesced by instructing a virtual switch of the first host computing system to route the network traffic between the workload and the second network device and to cease routing the network traffic between the workload and the first network device. The resource scheduling framework manages selection of the second network device based on the network traffic. In another example, if the first host computing system is coupled to a second network device and a third network device, then network traffic to the first network device is quiesced by instructing a virtual switch of the first host computing system to route the network traffic between the workload and one of the second and third network devices based on the network traffic at the second and third network devices. In other words, an underutilized network device (i.e., the network device having minimum network traffic) between the second and third network devices is selected to route the network traffic associated with the first host computing system.

At step 414, a check is made to determine whether any other host computing system is coupled to the first network device. At step 416, if any other host computing system is coupled to the first network device, then a next host computing system coupled to the first network device is identified. The steps 408-416 are repeated for all the host computing systems coupled to the first network device. Once the network traffic is quiesced to the first network device from all the host computing systems coupled to the first network device, the first network device can be placed into the maintenance mode.

For example, consider a virtualized computing environment having a first network device, a second network device, a first host computing system executing a first workload that transmits and receives network traffic via the first network device, and a second host computing system executing a second workload that transmits and receives network traffic via the second network device. When the first network device needs to be placed into maintenance mode, then the network traffic to the first network device is quiesced as follows. If the first host computing system is also coupled to the second network device, then the network traffic to the first network device is quiesced by instructing a virtual switch of the first host computing system to route the network traffic between the first workload and the second network device and to cease routing the network traffic between the first workload and the first network device. If the first host computing system is not coupled to the second network device, then the network traffic to the first network device is quiesced by initiating migration of the first workload to the second host computing system.

In various embodiments, the systems and methods described in FIGS. 1 through 4 propose a technique to place the network device into the maintenance mode by instructing a virtual switch to route the network traffic between the workload and other network device and/or initiating migration of the workload to other host computing system coupled to other network device. Using this technique, the network switch is placed into the maintenance mode without disconnecting any host computing systems or any other resources connected to the network device. Therefore, there is no downtime of the VMs running on the host computing systems except for the very brief pause incurred by a live migration. Also, the systems and methods described in FIGS. 1-4 can be applied to any network switch (e.g., edge switches 104A-N, switches 106A-N, and so on).

Figure 5:
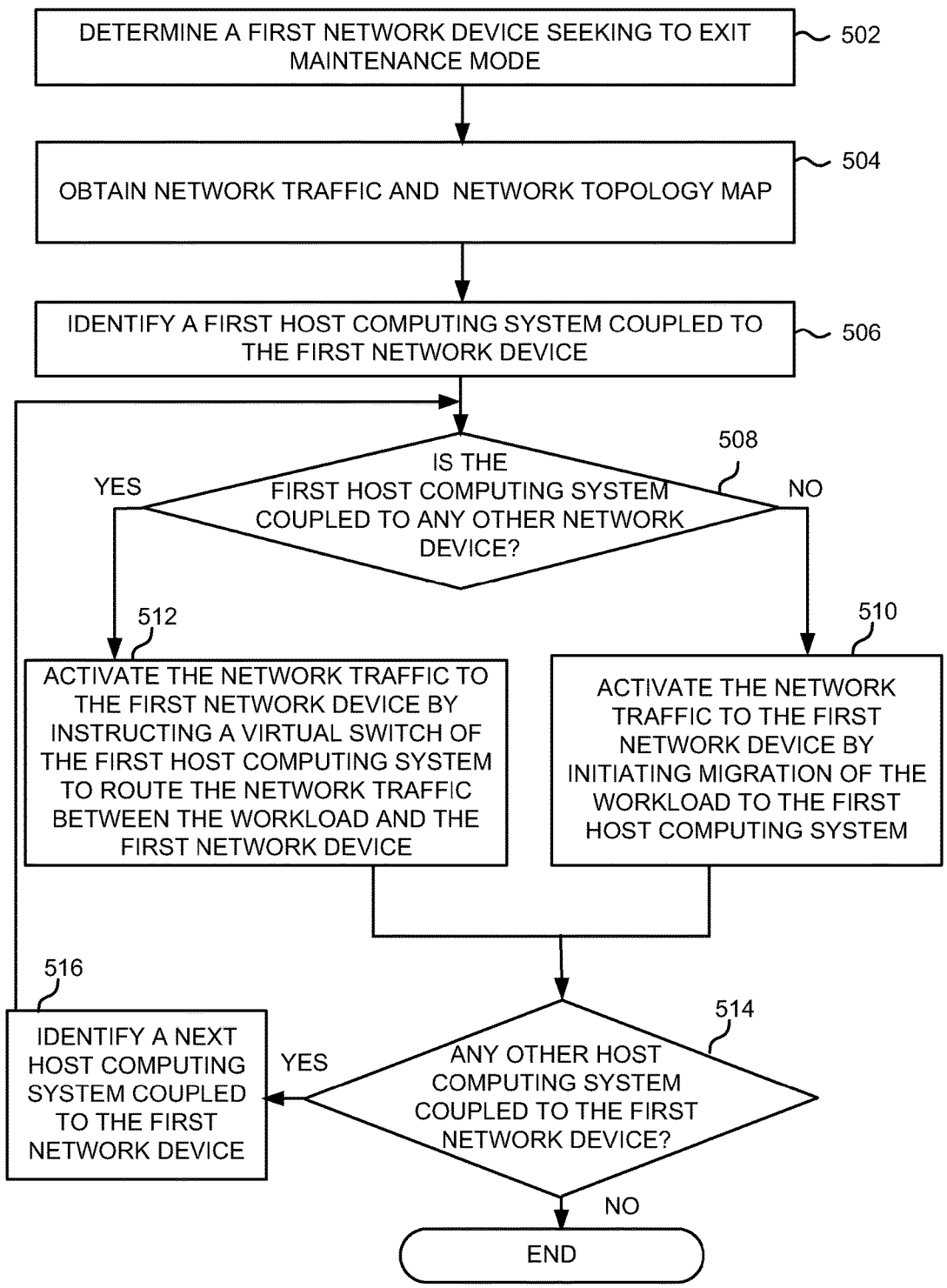
FIG. 5 is a flow chart of an example method for exiting the maintenance mode of the network device.

FIG. 5 is a flow chart 500 of an example method for exiting the maintenance mode of the network device. At step 502, the first network device seeking to exit maintenance mode is determined. The term "exit maintenance mode" refers to resumption of normal network traffic through the first network device. For example, the network switch may be exited from the maintenance mode upon performing replacement, hardware upgrade, service/repair, and/or software upgrade of the network switch. Once the first network device is back to normal and functioning, the virtual switches can be restored and the workloads can be migrated back to the first network device as follows. At step 504, network traffic and network topology map associated with the network switches are obtained using a monitoring interface (e.g., interfaces, protocols, and other mechanisms for discovering network topology maps and monitoring network statistics) as described above with reference to FIG. 1. At step 506, a first host computing system coupled to the first network device is identified.

At step 508, a check is made to determine whether the first host computing system is coupled to any other network device. At step 510, if the first host computing system is not coupled to any other network device, the network traffic to the first network device is activated by initiating migration (e.g., live migration) of the workload to the first host computing system. A resource scheduling framework performs the migration of the workload to the first host computing system.

At step 512, if the first host computing system is coupled to any other network device, the network traffic to the first network device is activated by instructing a virtual switch of the first host computing system to route the network traffic between the workload and the first network device. At step 514, a check is made to determine whether any other host computing system is coupled to the first network device. At step 516, if any other host computing system is coupled to the first network device, then a next host computing system coupled to the first network device is identified. The steps 508-516 are repeated for all the host computing systems coupled to the first network device.

Figure 6:
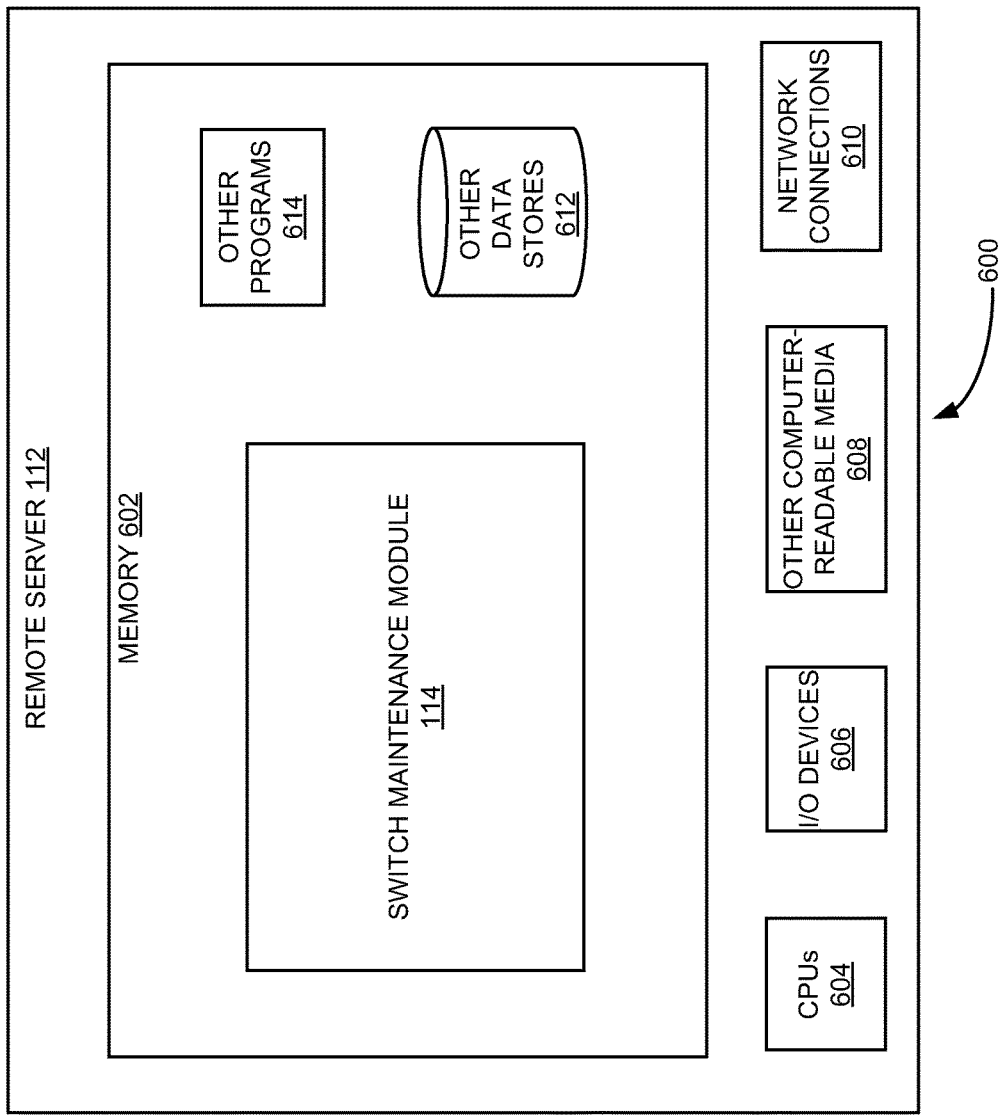
FIG. 6 is an example block diagram of a remote server for implementing a switch maintenance module, such as the one shown in FIGS. 1 and 3.

FIG. 6 is a block diagram 600 of an example remote server for implementing a switch maintenance module, such as the one shown in FIGS. 1 and 3, according to an example embodiment. In particular, FIG. 6 shows remote server 112 (e.g., a computing system) that may be utilized to implement switch maintenance module 114.

Note that one or more general purpose virtual or physical computer systems suitably instructed may be used to implement switch maintenance module 114. In addition, remote server 112 may comprise one or more distinct computing systems/devices and may span distributed locations. Furthermore, each block shown may represent one or more such blocks as appropriate to a specific embodiment or may be combined with other blocks. Also, switch maintenance module 114 may be implemented in software, hardware, firmware, or in some combination to achieve the capabilities described herein.

In the embodiment shown, remote server 112 may comprise computer memory ("memory") 602, one or more CPUs 604, input/output devices 606 (e.g., keyboard, mouse, etc.), other computer-readable media 608, and network connections 610. Switch maintenance module 114 is shown residing in memory 602. Switch maintenance module 114 may execute on one or more CPUs 604 and implement techniques described herein. Other code or programs 614 (e.g., an administrative interface, a Web server, and the like) and potentially other data repositories, such as data store 612, may also reside in memory 602, and execute on one or more CPUs 604. One or more of the components in FIG. 6 may not be present in any specific implementation. For example, some embodiments may not provide other computer readable media 608.

Switch maintenance module 114 may interact via a network with host computing systems. The network may be any combination of media (e.g., twisted pair, coaxial, fiber optic, radio frequency), hardware (e.g., routers, switches, repeaters, transceivers), and protocols (e.g., Transmission Control Protocol/Internet Protocol (TCP/IP), User Datagram Protocol (UDP), Ethernet, Wi-Fi, Worldwide Interoperability for Microwave Access (WiMAX)) that facilitate communication to and from remotely situated humans and/or devices.

As described above, switch maintenance module 114 places the network switch into the maintenance mode by dynamically reconfiguring virtual switches associated with the identified host computing systems and/or migrating the VMs running on the identified host computing systems based on the connectivity information and network traffic information.

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of switch maintenance module 114, such as in data store 612, can be available by standard mechanisms such as through C, C++, C#, and Java APIs, libraries for accessing files, databases, or other data repositories, through scripting languages such as Extensible Markup Language (XML), or through Web servers, File Transfer Protocol (FTP) servers, or other types of servers providing access to stored data. Data store 612 may be implemented as one or more database systems, file systems, or any other technique for storing such information, or any combination of the above, including implementations using distributed computing techniques.

Different configurations and locations of programs and data are contemplated for use with techniques of described herein. A variety of distributed computing techniques are appropriate for implementing the components of the illustrated embodiments in a distributed manner including but not limited to TCP/IP sockets, WebSockets, Hyper Text Transfer Protocol (HTTP), web services (XML-Based Remote Procedure Call (XML-RPC), Java API for XML-Based Remote Procedure Call (JAX-RPC), Simple Object Access Protocol (SOAP), and the like). Other variations are possible. Also, other functionality could be provided by each component/module, or existing functionality could be distributed amongst the components/modules in different ways, yet still achieve the functions described herein.

Furthermore, in some embodiments, some or all of the components of switch maintenance module 114 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a non-transitory computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored on tangible, non-transitory storage mediums. Some or all of the system components and data structures may also be provided as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

From the foregoing it will be appreciated that, although specific embodiments have been described herein for purposes of illustration, various modifications may be made without deviating from the spirit and scope of this disclosure. For example, the methods, techniques, and systems for placing the network switch into the maintenance mode are applicable to other architectures or in other settings. Also, the methods, techniques, and systems discussed herein are applicable to differing protocols, communication media (optical, wireless, cable, etc.) and devices (e.g., desktop computers, wireless handsets, electronic organizers, personal digital assistants, tablet computers, portable email machines, game machines, pagers, navigation devices, etc.).

The invention claimed is:

1. An automated method of placing a first physical network switch into a maintenance mode in a virtualized computing environment comprising:
    identifying a first host computing system coupled to the first physical network switch by a processor of a remote server upon receiving a request to place the first physical network switch into the maintenance mode, the first host computing system executing a workload that transmits and receives network traffic via the first physical network switch, which routes/carries the network traffic;
    determining whether the first host computing system is coupled to a second physical network switch by the processor,
    if the first host computing system is not coupled to the second physical network switch, quiescing, by the processor, the network traffic to the first physical network switch by initiating migration of the workload to a second host computing system coupled to any other physical network switch;
    if the first host computing system is coupled to the second physical network switch, quiescing, by the processor, the network traffic to the first physical network switch by instructing a virtual switch residing in the first host computing system to route the network traffic between the workload and the second physical network switch, and cease routing the network traffic between the workload and the first physical network switch; and
    placing the first physical network switch into the maintenance mode by the processor upon quiescing the network traffic to the first physical network switch.

2. The method of claim 1, further comprising:
    repeating the steps of identifying, determining and quiescing for each host computing system coupled to the first physical network switch.

3. The method of claim 1, wherein in instructing the virtual switch to route the network traffic between the workload and the second physical network switch, the second physical network switch is selected based on network traffic at the second physical network switch.

4. The method of claim 3, wherein the second physical network switch is selected using a resource scheduling framework.

5. The method of claim 1, wherein in initiating the migration of the workload to the second host computing system, the second host computing system is selected based on network traffic at the other physical network switches.

6. The method of claim 5, wherein the second host computing system is selected using a resource scheduling framework.

7. The method of claim 1, further comprising exiting the maintenance mode of the first physical network switch, comprising:
    if the first host computing system is not coupled to the second physical network switch, activating the network traffic to the first physical network switch by initiating migration of the workload to the first host computing system; and
    if the first host computing system is coupled to the second physical network switch, activating the network traffic to the first physical network switch by instructing the virtual switch of the first host computing system to route the network traffic between the workload and the first physical network switch.

8. The method of claim 7, further comprising:
    repeating the steps of claim 7 for each host computing system coupled to the first physical network switch.

9. The method of claim 1, wherein the first physical network switch is placed into the maintenance mode for at least one of replacement, hardware upgrade, and software upgrade of the first physical network switch.

10. A system comprising:
    a plurality of physical network switches;
    a plurality of host computing systems; and
    a remote server comprising a processor and memory coupled to the processor, wherein the memory includes a switch maintenance module to automatically place a first physical network switch into a maintenance mode in a virtualized computing environment, by:
        identifying a first host computing system coupled to the first physical network switch upon receiving a request to place the first physical network switch into the maintenance mode, the first host computing system executing a workload that transmits and receives network traffic via the first physical network switch, which routes/carries the network traffic;

determining whether the first host computing system is coupled to a second physical network switch;

if the first host computing system is not coupled to the second physical network switch, quiescing the network traffic to the first physical network switch by initiating migration of the workload to a second host computing system coupled to any other physical network switch;

if the first host computing system is coupled to the second physical network switch, quiescing the network traffic to the first physical network switch by instructing a virtual switch residing in the first host computing system to route the network traffic between the workload and the second physical network switch, and cease routing the network traffic between the workload and the first physical network switch; and automatically place the first physical network switch into the maintenance mode upon quiescing the network traffic to the first physical network switch.

11. The system of claim 10, wherein the switch maintenance module repeats the steps of identifying, determining and quiescing for each host computing system coupled to the first physical network switch.

12. The system of claim 10, wherein the switch maintenance module instructs the virtual switch of the first host computing system to route the network traffic between the workload and the second physical network switch based on network traffic at the second physical network switch.

13. The system of claim 12, wherein the second physical network switch is selected using a resource scheduling framework.

14. The system of claim 10, wherein the switch maintenance module initiates migration of the workload to the second host computing system coupled to any other physical network switch based on network traffic at the other physical network switches.

15. The system of claim 14, wherein the second host computing system is selected using a resource scheduling framework.

16. The system of claim 10, wherein the switch maintenance module exits the maintenance mode of the first physical network switch, by:

if the first host computing system is not coupled to the second physical network switch, activating the network traffic to the first physical network switch by initiating migration of the workload to the first host computing system; and if the first host computing system is coupled to the second physical network switch, activating the network traffic to the first physical network switch by instructing the virtual switch of the first host computing system to route the network traffic between the workload and the first physical network switch.

17. The system of claim 16, wherein the switch maintenance module repeats the steps of claim 16 for each host computing system coupled to the first physical network switch.

18. The system of claim 10, wherein the first physical network switch is placed into the maintenance mode for at least one of replacement, hardware upgrade, and software upgrade of the first physical network switch.

19. A non-transitory computer-readable storage medium including instructions that are configured, when executed by a computing device, to perform an automated method of placing a first physical network switch into a maintenance mode in a virtualized computing environment, the method comprising:

identifying a first host computing system coupled to the first physical network switch upon receiving a request to place the first physical network switch into the maintenance mode, the first host computing system executing a workload that transmits and receives network traffic via the first physical network switch, which routes/carries the network traffic;

determining whether the first host computing system is coupled to a second physical network switch;

if the first host computing system is not coupled to the second physical network switch, quiescing the network traffic to the first physical network switch by initiating migration of the workload to a second host computing system coupled to any other physical network switch;

if the first host computing system is coupled to the second physical network switch, quiescing the network traffic to the first physical network switch by instructing a virtual switch residing in the first host computing system to route the network traffic between the workload and the second physical network switch, and cease routing the network traffic between the workload and the first physical network switch; and placing the first physical network switch into the maintenance mode upon quiescing the network traffic to the first physical network switch.

20. The non-transitory computer-readable storage medium of claim 19, further comprising:

repeating the steps of identifying, determining and quiescing for each host computing system coupled to the first physical network switch.

21. The non-transitory computer-readable storage medium of claim 19, wherein in instructing the virtual switch to route the network traffic between the workload and the second physical network switch, the second physical network switch is selected based on network traffic at the second physical network switch.

22. The non-transitory computer-readable storage medium of claim 19, wherein in initiating the migration of the workload to the second host computing system, the second host computing system is selected based on network traffic at the other physical network switch.

23. The non-transitory computer-readable storage medium of claim 19, further comprising exiting the maintenance mode of the first physical network switch, comprising:

if the first host computing system is not coupled to the second physical network switch, activating the network traffic to the first physical network switch by initiating migration of the workload to the first host computing system; and if the first host computing system is coupled to the second physical network switch, activating the network traffic to the first physical network switch by instructing the virtual switch of the first host computing system to route the network traffic between the workload and the first physical network switch.

24. The non-transitory computer-readable storage medium of claim 23, further comprising:

repeating the steps of claim 23 for each host computing system coupled to the first physical network switch.

25. A system comprising:

a first physical network switch and a second physical network switch;

a first host computing system and a second host computing system, wherein the first host computing system executing a first workload that transmits and receives network traffic via the first physical network switch that routes/carries the network traffic and the second host computing system executing a second workload that transmits and receives network traffic via the second physical network switch; and a remote server comprising a processor and memory coupled to the processor, wherein the memory includes a switch maintenance module to automatically place the first physical network switch into a maintenance mode in a virtualized computing environment, by:

receiving a request to place the first physical network switch into the maintenance mode;

determining whether the first host computing system is coupled to the second physical network switch upon receiving the request;

quiescing the network traffic to the first physical network switch by initiating migration of the first workload to the second host computing system if the first host computing system is not coupled to the second physical network switch;

quiescing the network traffic to the first physical network switch by instructing a virtual switch of the first host computing system to route the network traffic between the first workload and the second physical network switch and cease routing the network traffic between the first workload and the first physical network switch if the first host computing system is coupled to the second physical network switch; and automatically placing the first physical network switch into the maintenance mode upon quiescing the network traffic to the first physical network switch.

* * * * *